United States Patent
Kusumoto et al.

(10) Patent No.: US 7,287,036 B2
(45) Date of Patent: Oct. 23, 2007

(54) METHOD AND APPARATUS FOR AUTOMATICALLY SEARCHING HYPERTEXT STRUCTURE

(75) Inventors: Koji Kusumoto, San Jose, CA (US); Tetsuya Yoshimura, San Jose, CA (US); Yoshihide Kotani, San Jose, CA (US); Kazushige Oikawa, San Jose, CA (US)

(73) Assignee: K-Plex Inc., San Jose, CA (US)

( * ) Notice: Subject to any disclaimer, the term of this patent is extended or adjusted under 35 U.S.C. 154(b) by 189 days.

(21) Appl. No.: 10/135,402

(22) Filed: May 1, 2002

(65) Prior Publication Data

US 2002/0165858 A1    Nov. 7, 2002

(30) Foreign Application Priority Data

May 1, 2001    (JP)    ............... 2001-134085

(51) Int. Cl.
*G06F 17/00*    (2006.01)
(52) U.S. Cl. ............ 707/102; 715/513; 715/514
(58) Field of Classification Search ......... 707/1–5, 707/100; 715/113–114, 526
See application file for complete search history.

(56) References Cited

U.S. PATENT DOCUMENTS

| | | | |
|---|---|---|---|
| 6,195,679 B1 | 2/2001 | Bauersfeld et al. | |
| 6,718,329 B1* | 4/2004 | Selvin et al. ............ | 707/10 |
| 6,732,102 B1* | 5/2004 | Khandekar ............. | 707/10 |
| 2002/0136167 A1* | 9/2002 | Steele et al. ............ | 370/260 |
| 2005/0091572 A1* | 4/2005 | Gavrilescu et al. ...... | 715/500 |

FOREIGN PATENT DOCUMENTS

| | | |
|---|---|---|
| EP | 1 221 661 A2 | 7/2002 |
| WO | WO99/01819 A1 | 1/1999 |
| WO | WO 01/09714 A2 | 2/2001 |
| WO | WO 01/57718 A2 | 8/2001 |

OTHER PUBLICATIONS

Wood, Lauren; "Programming the Web: The W3C DOM Specification;" IEEE Internet Computing; vol. 3, No. 1, Jan. 1999; pp. 48-54.
Goodman, Danny; "Javascript Bible (3rd Edition)"; 1998, pp. 145-151.
Aoki, Y. et al., "Web Operation recorder and Player," 2000 IEEE, pp. 501-508.

* cited by examiner

*Primary Examiner*—Alford W Kindred
(74) *Attorney, Agent, or Firm*—Birch, Stewart, Kolasch & Birch, LLP

(57) ABSTRACT

A method and apparatus for automatically accessing a WWW page is provided for realizing a function of automatically jumping to a desired page to automatically download desired data in spite of intervening pages which require a user to enter information, and a function of dealing with a change in configuration of an accessed page. In a web browser, a list structure is created for each displayed window, and all nodes under HTML displayed in a window corresponding to the list structure are copied and stored as node information. Further, when an event occurs with respect to an arbitrary node within a window, an address and event type of the node are recorded in the stored node information corresponding to the node. The record is comprised of a sequence of records of an event occurrence address and event type by using URL and window identifier as keys.

16 Claims, 16 Drawing Sheets

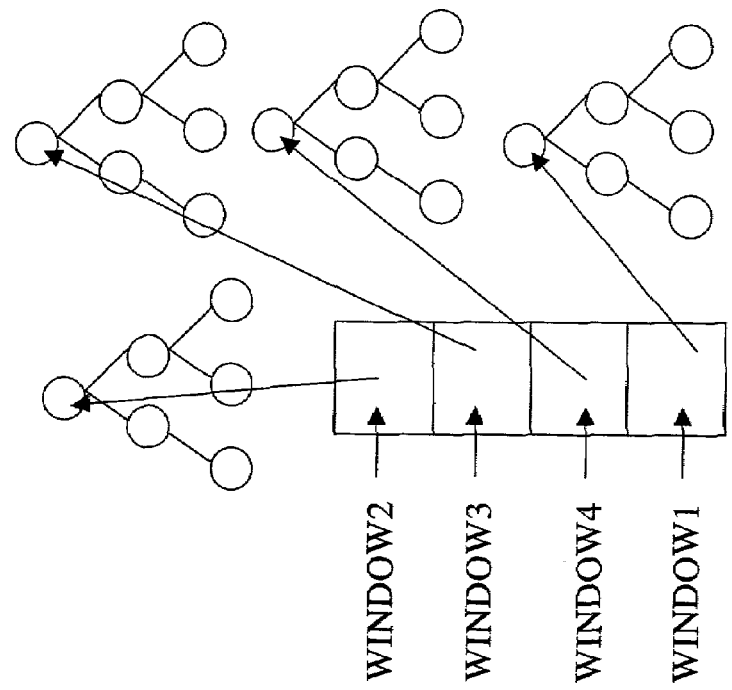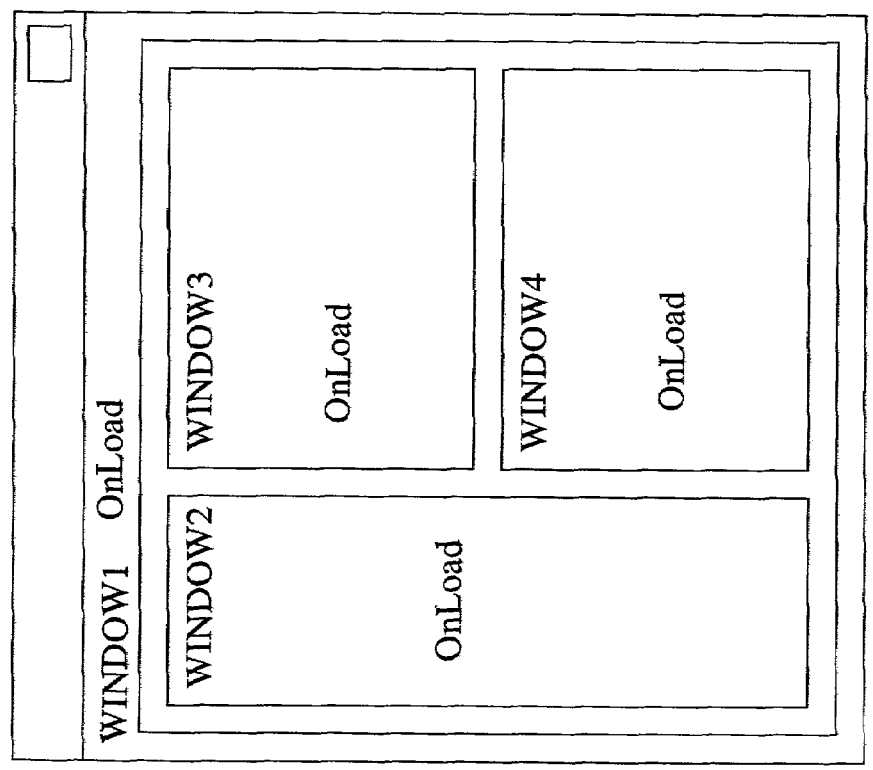
Fig.7

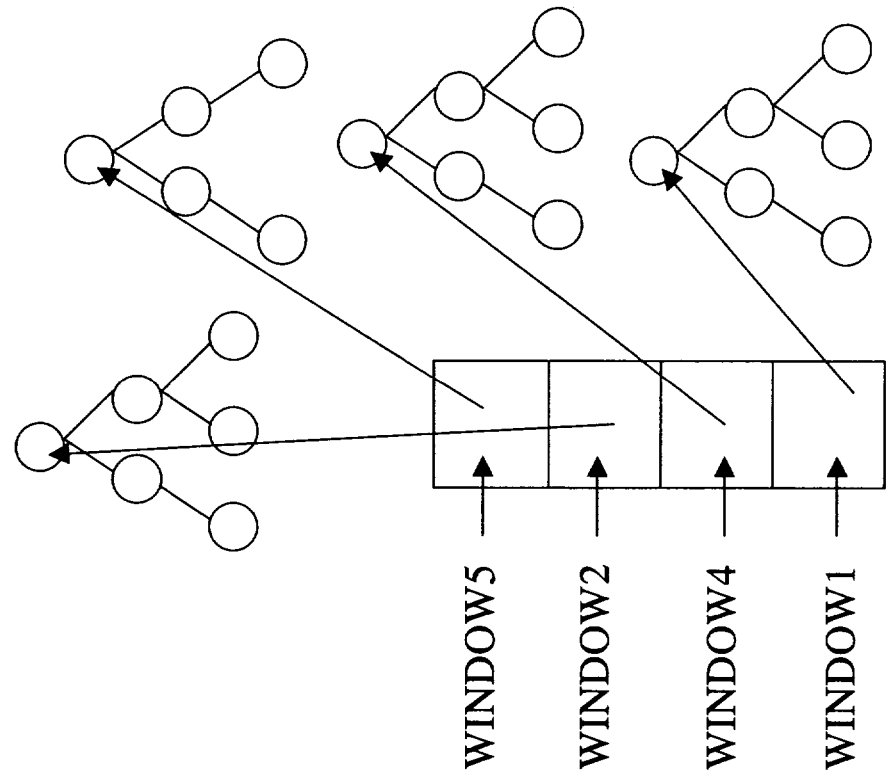
Fig.10
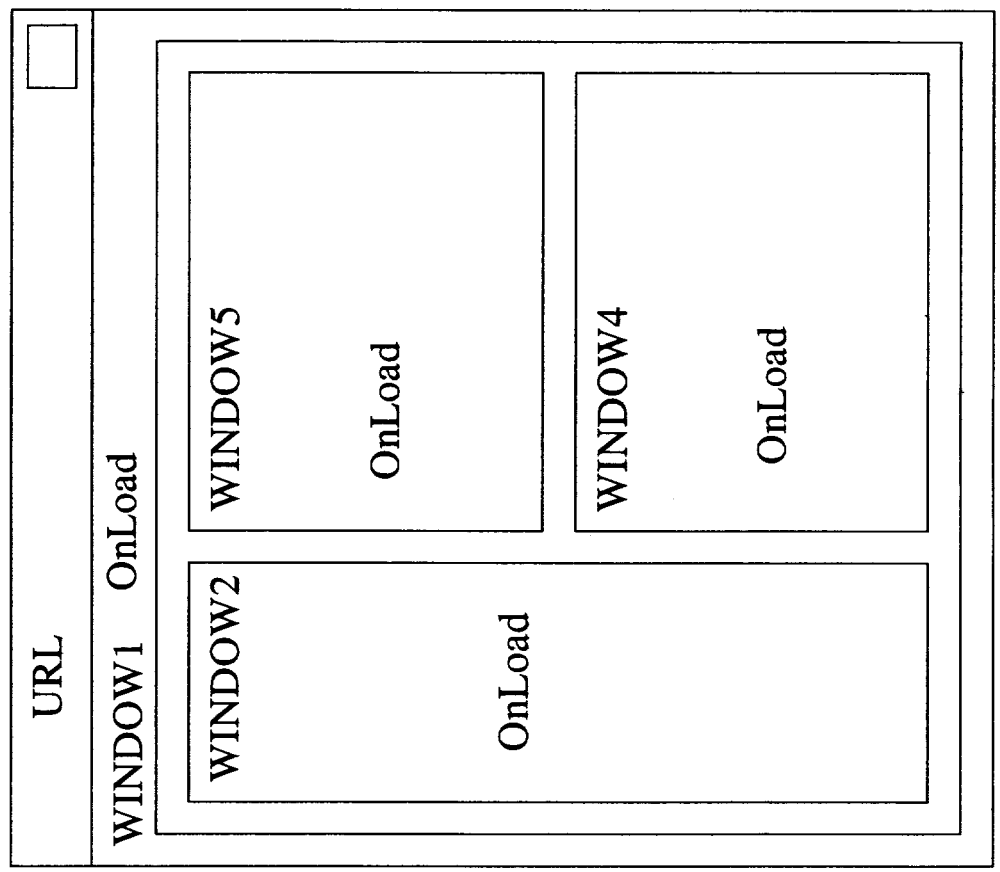

Fig.13

| URL/Window_ID | Address | Event Type | Submit Information For Server |
|---|---|---|---|
| URL NAME | | | |
| Window2 | DOCUMENT[1]/.../10-A[8] | click | |
| Window5 | DOCUMENT[1]/.../2-Form[1] | submit | (... INPUT/ name = 'aaa password = 'bbb' ... |
| Window6 | DOCUMENT[1]/.../1-A[1] | click | |
| Window7 | DOCUMENT[1]/.../2-TR[2] | selected | |

… …

METHOD AND APPARATUS FOR AUTOMATICALLY SEARCHING HYPERTEXT STRUCTURE

BACKGROUND OF THE INVENTION

The present invention relates to a function of a web browser, and more particularly, to an extension of a function for accessing WWW (World Wide Web) using a web browser.

Using a web browser, the WWW can be accessed by entering URL (Uniform Resource Locator) of desired WWW to display a page of the WWW; clicking on a link on the displayed page to jump to a next page linked to the displayed page; or recording URL of a desired page using a function called "bookmark" so as to jump directly to the bookmarked page for display at a later time.

When a user wishes to directly access a desired page, the aforementioned bookmark function is convenient and effective. However, when any page intervening between a home page of certain WWW and a desired page requires the user to enter user information (for example, a password) before the desired page is reached, the user cannot directly jump to the desired page even if the desired page itself is already bookmarked.

Accordingly, when the user wishes to jump to a certain page to periodically download certain data by means of batch processing, the user is required to repeat the similar operation to access the page every time.

Thus, there has been a need for a function of not only automatically jumping to a desired page to automatically download desired data even if there is an intervening page requiring for the user to enter user information but also, even if the configuration of the page is changed, perceiving the change to avoid trouble, inform the user of the change, etc.

SUMMARY OF THE INVENTION

It is therefore an object of the present invention to provide a method and apparatus for implementing a function of recording accesses to pages by means of a web browser, mouse manipulation on a page and manipulations on a keyboard for entering data; a function of managing such records such that a user can reference the records; and a function of invoking such records to execute reproduction processing based on the invoked records.

The method and apparatus according to the present invention further provide a function of comparing the configuration of the recorded page with the configuration of the actually accessed page while reproducing records to determine if there has been any change in the configuration and, if it transpires that there has been a change, avoid downloading the page or issue a warning about the change in the configuration.

A technique for recording details of manipulations on a web browser to reproduce the records is expected to be suitably applied to information routinely accessed by an individual, which however is not commonly accessed by many and unspecified persons. Since information required by a large number of people is often placed on a top page or on pages close to the top page, there are not many merits in invoking recorded manipulations and reproducing them to automatically access such a page. However, when 1) users wish to periodically access information which changes daily or with time and (2) different users desire different contents of information, it often requires burdensome manipulations to actually access such information.

Examples of such information are the balance on one's account, the latest stock price of some stock in which an individual invested and so on. Although an individual can browse WWW for such information these days, it still involves such a procedure as entering a user number or password if not multiple times to check the balance on his (her) account. Likewise, in checking a stock price, it is required to enter a name of its brand every time.

For such information, it would be really convenient and advantageous if a user could access a desired page instantaneously and display on the screen not only the page but also the contents of an object to be searched in the page simply by applying records of his (her) manipulations kept track of by the user. Further, if the user could instantaneously access a desired page as mentioned above, (s)he could avoid miscellaneous advertisements usually appearing on web pages before (s)he actually gets to the desired information.

However, it goes without saying that the present invention is not limited to the aforementioned type of information or the configuration of WWW and can be applied to a variety of information provided on the web and/or configurations of WWW.

BRIEF DESCRIPTION OF THE DRAWINGS

FIG. 7 is a conceptual diagram showing a list when all nodes of HTML have been loaded;

FIG. 10 is a conceptual diagram showing how a list and a node are generated when a new window is loaded;

FIG. 13 is a conceptual diagram showing a format of records created in a recording mode of the present invention;

DETAILED DESCRIPTION OF THE EMBODIMENTS

Figure 1:
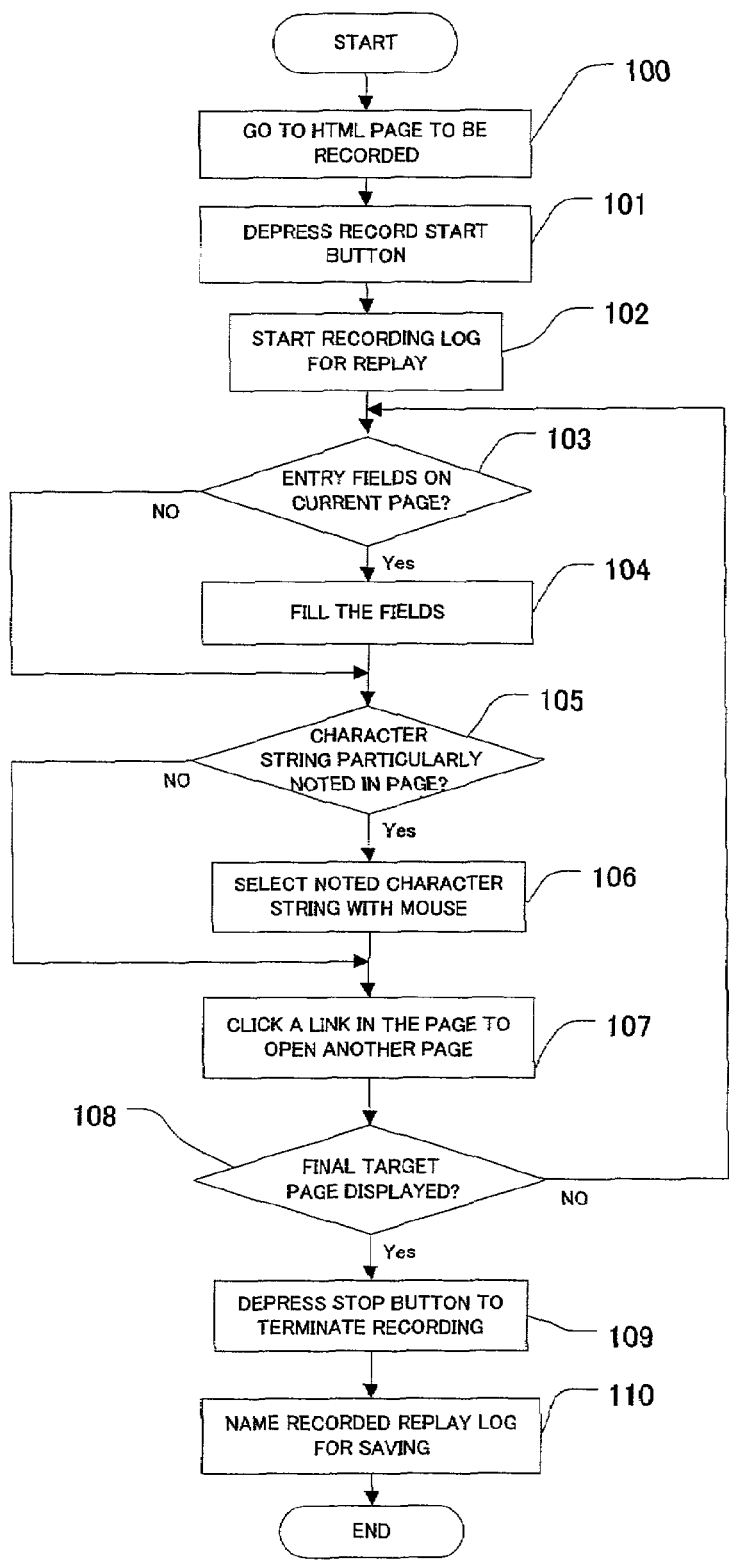
FIG. 1 is a flow chart showing the steps of recording manipulations for accessing WWW in accordance with the present invention.
Figure 2:
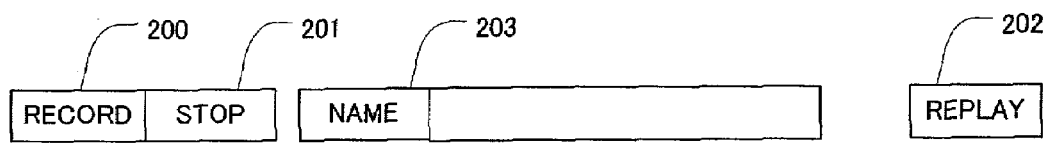
FIG. 2 is a conceptual diagram of a user interface displayed on a manipulation screen in accordance with the present invention.
Figure 3:
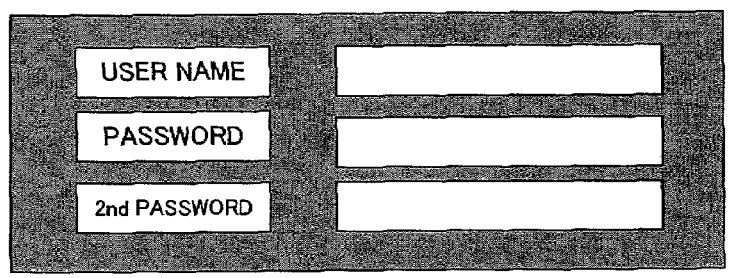
FIG. 3 is a diagram illustrating entry items which may be displayed in the middle of an access.

Referring first to FIGS. 1 through 3, an operation for recording manipulation for accessing desired WWW to display a desired page and indicating information of contents in the page that a user is especially interested in.

FIG. 1 is a flow chart showing the steps of recording the manipulations.

First, the user displays on the screen a top page which provides information of desired WWW (step 100), by entering, for example, a normal URL address to open the page. In this event, three buttons "RECORD" 200, "STOP" 201 and "REPLAY" 202, and a window 203 for entering a "RECORD NAME" are displayed as illustrated in FIG. 2 at appropriate locations on a web browser.

Next, the user depresses the "RECORD" button 200 (step 101). Once the "RECORD" button 200 has been depressed, all manipulations such as a mouse operation for jumping by clicking on a link, entering data through a keyboard, etc. are all recorded (step 102) until the user depresses the "STOP" button 201.

Details on the above-mentioned recording will be described later.

If the displayed page has an item to be entered by the user (step 103), the user enters the item (step 104), and manipulations involved therein are recorded. While there could be a variety of items to be entered, such dialog boxes in which a user name and passwords are entered as indicated in FIG. 3 may be the most typical.

If there is a character string on the current page which a user is particularly interested in (step 105), the user selects the character string using a mouse (step 106).

Then, the user clicks a link anywhere on the page to open another page (step 107).

If a final target page is displayed (step 108), the process goes to step 109 and, if not, returns to step 103, from where the user continues manipulations.

The user depresses the STOP button 201 (step 109), as a result of which the recording of manipulations is stopped, and the user names a reproduction log (recorded contents) and saves the same under the name (step 110). The name is entered in the "RECORD NAME" entry window 203.

Thus, the recording is completed.

Next, referring to FIGS. 4 through 13, an embodiment of a recording format according to the present invention will be more specifically described, using as an example of a web browser, Internet Explorer (Registered Trademark: hereafter referred to as 'IE') of Microsoft Corporation.

Figure 4:
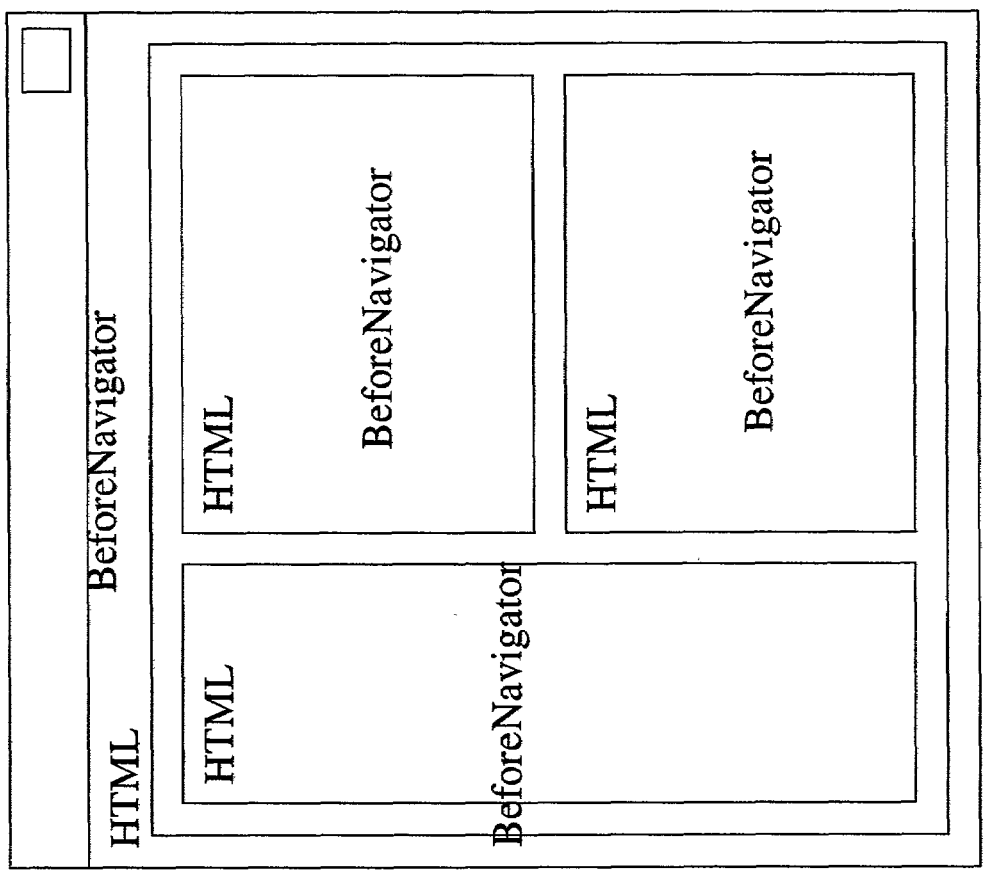
FIG. 4 is a conceptual diagram showing a display layout immediately after a certain page has been displayed.

FIG. 4 generally shows frames displayed on the browser when the user depresses the button 200 in FIG. 2 to select a recording mode. The drawing shows an abstract illustration of a page display layout having frame structures.

The moment a recording mode is selected, the recording mode is started.

FIG. 4 shows the state immediately after the user has entered an URL of a top page to be recorded, or clicked on a link on a certain page.

An event labeled "BeforeNavigator" occurs when certain URL is about to be displayed from one IE to one HTML. When displaying a page having three frames as shown in FIG. 4, there are actually four HTMLs including a base page, and the event "BeforeNavigator" occurs in each of the four HTMLS.

Next, when a display of certain URL from one IE to one HTML is completed, an event labeled "DocumentComplete" occurs.

Figure 5:
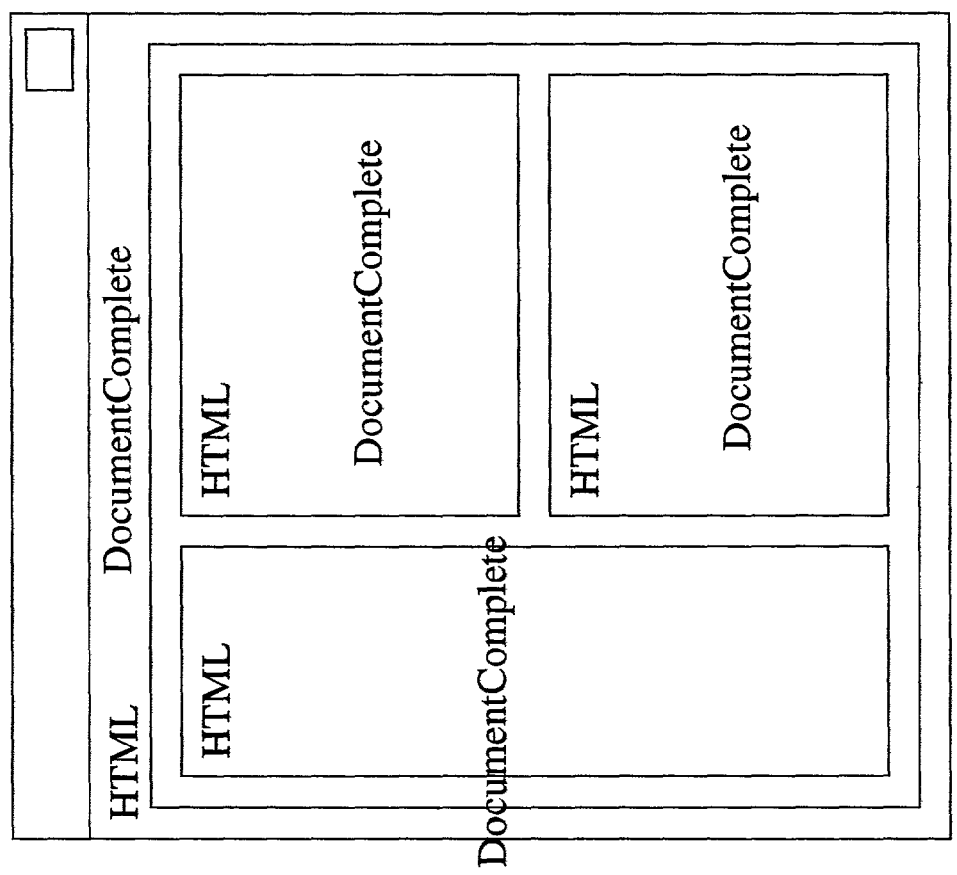
FIG. 5 is a conceptual diagram showing a display layout when logical windows have been completed on a certain page.

As shown in FIG. 5, upon completion of display, the event "DocumentComplete" occurs in each of the four HTMLs shown in FIG. 4. When the event "DocumentComplete" occurs, it means a window has been established. It should be noted that this window is a logical window which is not physically visible on the screen. Thus, when the event occurs, it means that the associated HTML document can be viewed and that a logical profile of a fully loaded object, i.e., an invisible window has been established.

Figure 6:
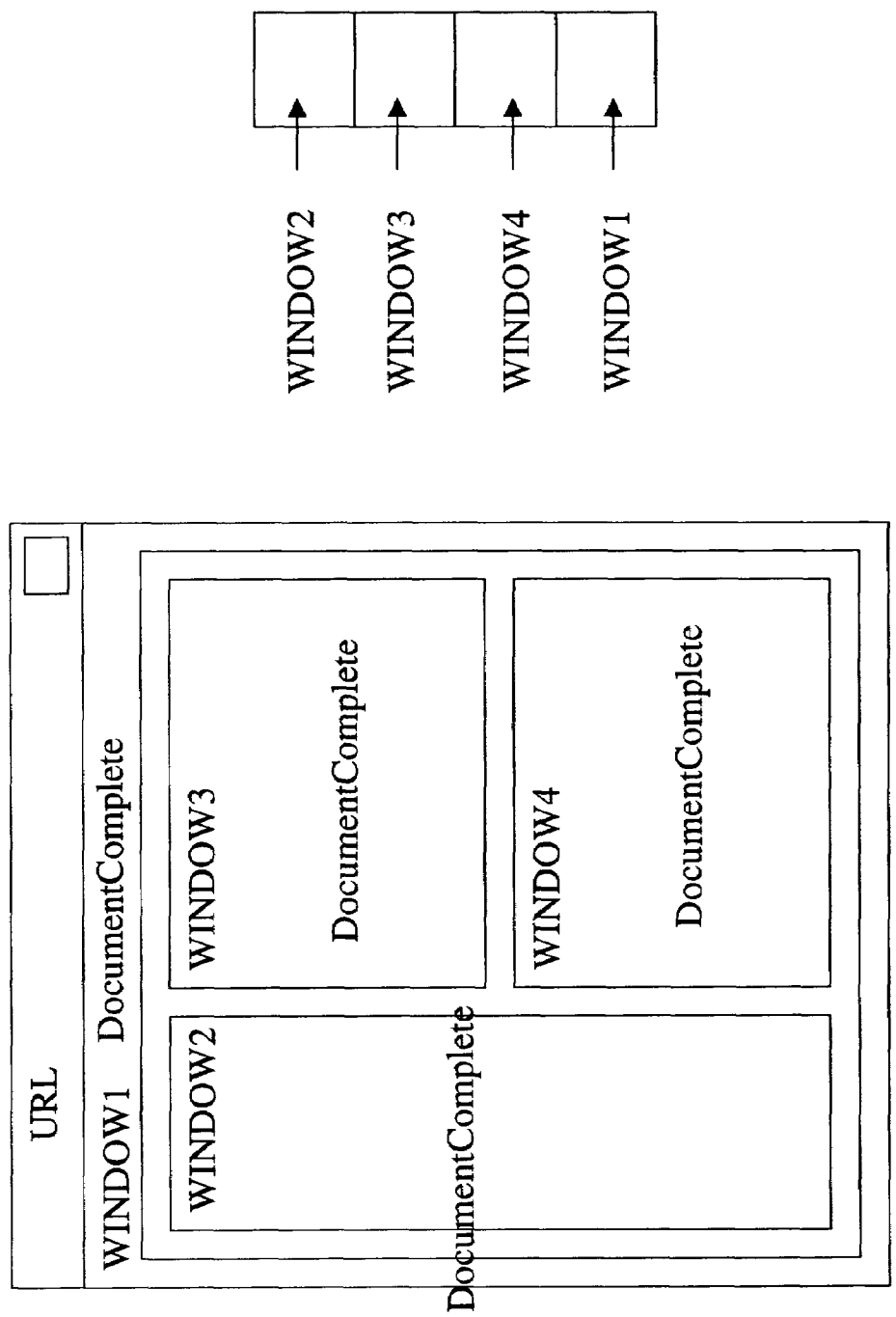
FIG. 6 is a conceptual diagram showing that one list structure is created for each window in the present invention.
Figure 8:
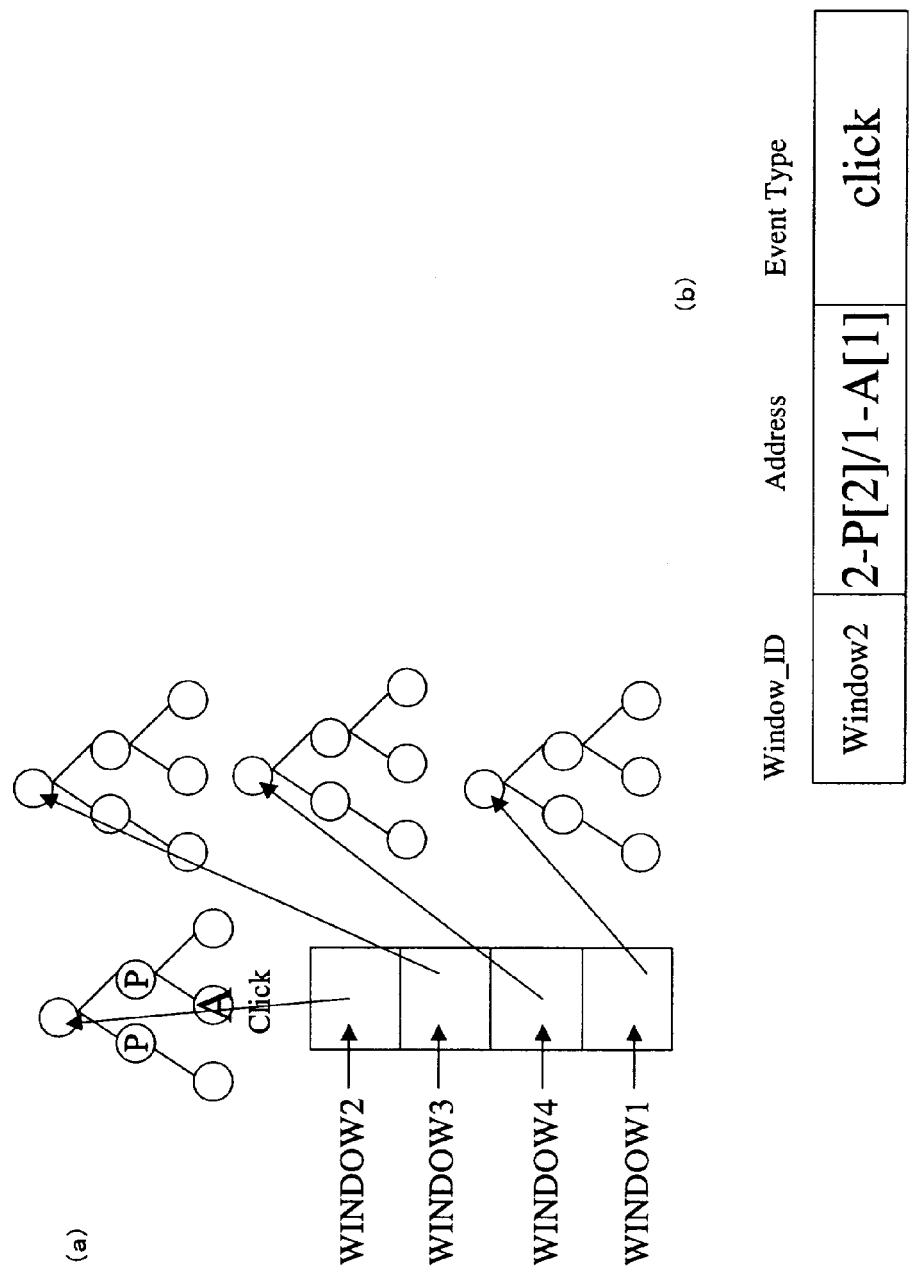
FIGS. 8A and 8B are conceptual diagrams showing how all nodes are copied in accordance with the present invention.

For the sake of argument, the windows are labeled WINDOW1, WINDOW2, WINDOW3 and WINDOW4 respectively (see FIG. 6). The windows are numbered in the order that they are established. When windows are simultaneously established in a web browser, a window whose origin is located at the most upper left on a web browser is numbered first and a window whose origin is located at the second most upper left on the web browser is numbered second and so on. Then, a list structure is created window by window at the time at which the window is established, and node lists of all the nodes under the displayed HTMLs are created. The nodes constitute a tree structure.

When an OnLoad event indicative of completion of loading of all the nodes in each WINDOW occurs, it means that display of HTML to be displayed in the window has been completed (FIG. 7). In other words, at this time, all nodes on an HTML page loaded into a window associated with the page are stored in each list.

At the time the nodes have been created, all the nodes are copied inside, because nodes associated with a displayed page are all discarded if the page is changed, which will be more specifically described later. An internal structure at the time of copying corresponds to a unique address in the HTML page (FIG. 8a).

Next, if a mouse event occurs on a node in the window, an address and an event type describing a context in which the node is reached are recorded (FIG. 8b). In this event, only a base page as of when the recording was started, that is, the URL of the HTML in the WINDOW1 in this example, is recorded at the head as recording information. A screen loaded in response to entry of this URL is WINDOW1. Normally, screens WINDOW2, WINDOW3, WINDOW4 are invoked from WINDOW 1. The URLs other than the first one of WINDOW 1 are not recorded for the following reason. Generally, a page created by a program such as CGI (Common Gateway Interface) differs in URL every time the program is executed. Also, it is difficult to automatically detect variable URL returned by some program. Therefore, in the present invention, address and event type are managed by a window displaying the page instead of URL information of that page. In other words, they are managed under a window number given to each window.

For example, it is assumed here that a user clicks on a link tag in a certain paragraph within WINDOW 2. In response, WINDOW2 and the clicked-on location within the HTML page are recorded as relative addresses in an address record. Then, an event type corresponding to the node is recorded. Since a link element is clicked on in this example, an event type called "Click" is recorded. A format for this recording will be described later.

When display of a window is changed next time, an UnLoad event is issued once while the window is discarded. At this time, the list corresponding to the discarded window is also discarded once.

Figure 9:
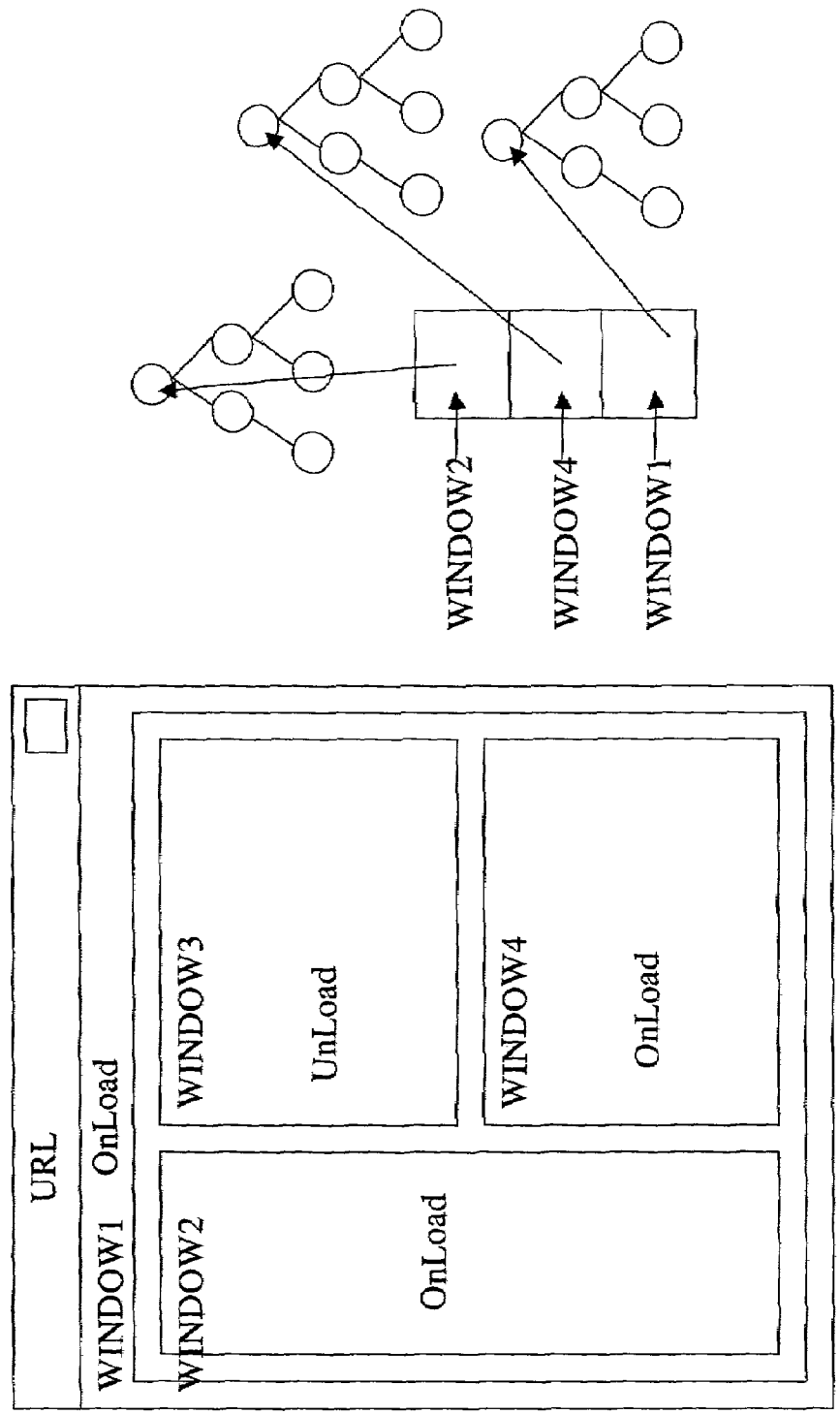
FIG. 9 is a conceptual diagram showing how a list is deleted when an UnLoad event occurs.
Figure 11:
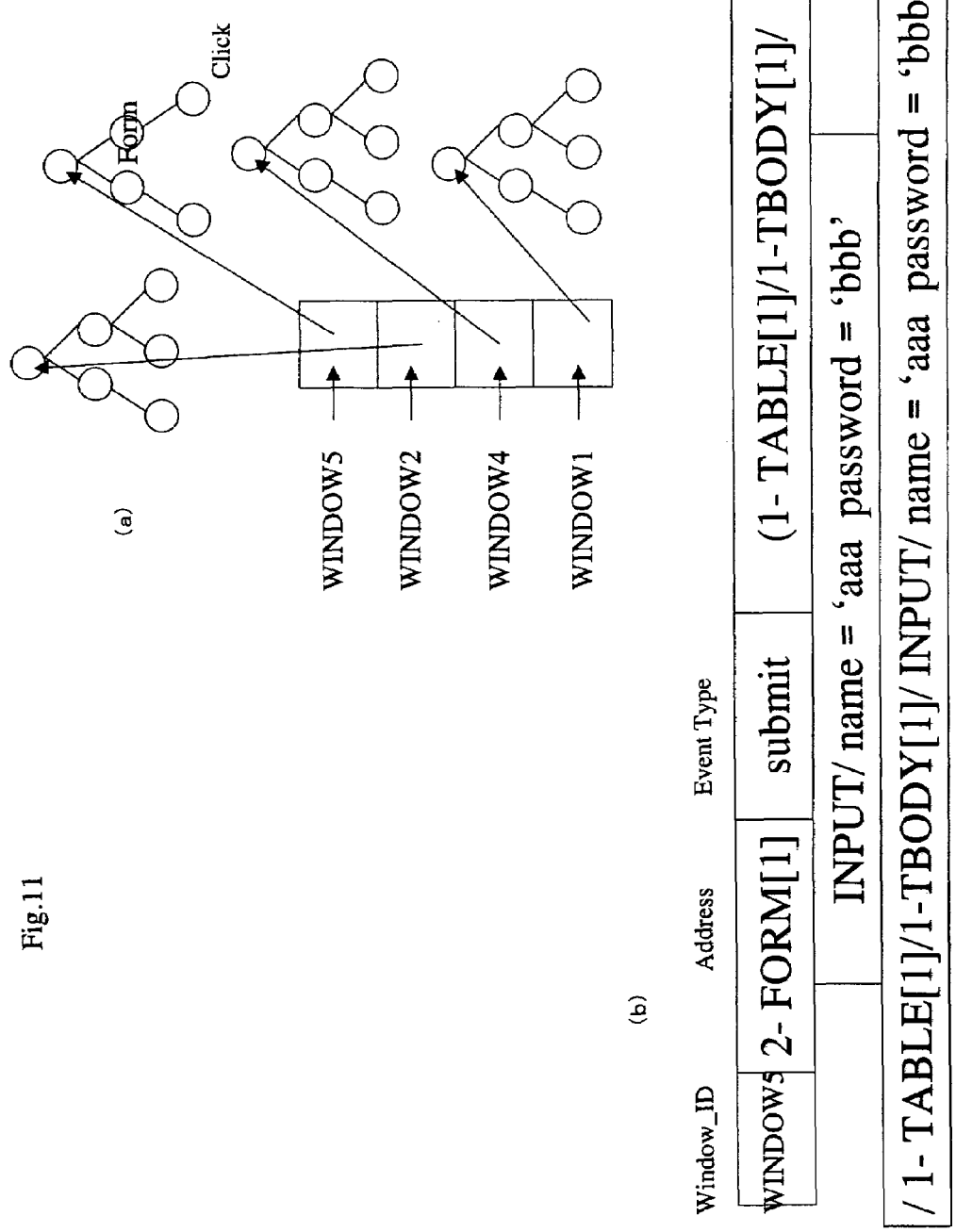
FIGS. 11A and 11B are conceptual diagram of a record associated with issuance of a Submit event.

For example, it is assumed that a page in WINDOW3 is updated by clicking on a certain link within WINDOW2 as described above. The moment the link is clicked on, WINDOW3 issues an UnLoad event. In response, a portion corresponding to WINDOW3 is deleted from the list once (FIG. 9).

Next, as WINDOW5 is newly loaded in place of the deleted WINDOW3, an event OnLoad is issued. In this event, WINDOW5 is again created in the list, and nodes below WINDOW5 are copied inside (FIG. 10).

It is assumed here that a user moves a mouse onto the newly loaded WINDOW5, and clicks, for example, on a login button which is located in a certain paragraph within the window displaying WINDOW5 (FIG. 11A).

In response, a WINDOW identifier and the clicked-on location within the HTML page are recorded as relative addresses in the address record. Then, an event type corresponding to the node is recorded. Since a form element was clicked on in this example, event information called "Submit" is recorded (FIG. 11B).

Since Submit sends several pieces of information to a target site, information entered for submission at this stage is also recorded. Since a range to be submitted is described in the page, its elements are also recorded in the address format. The contents to be submitted are parenthesized when recorded.

Figure 12:
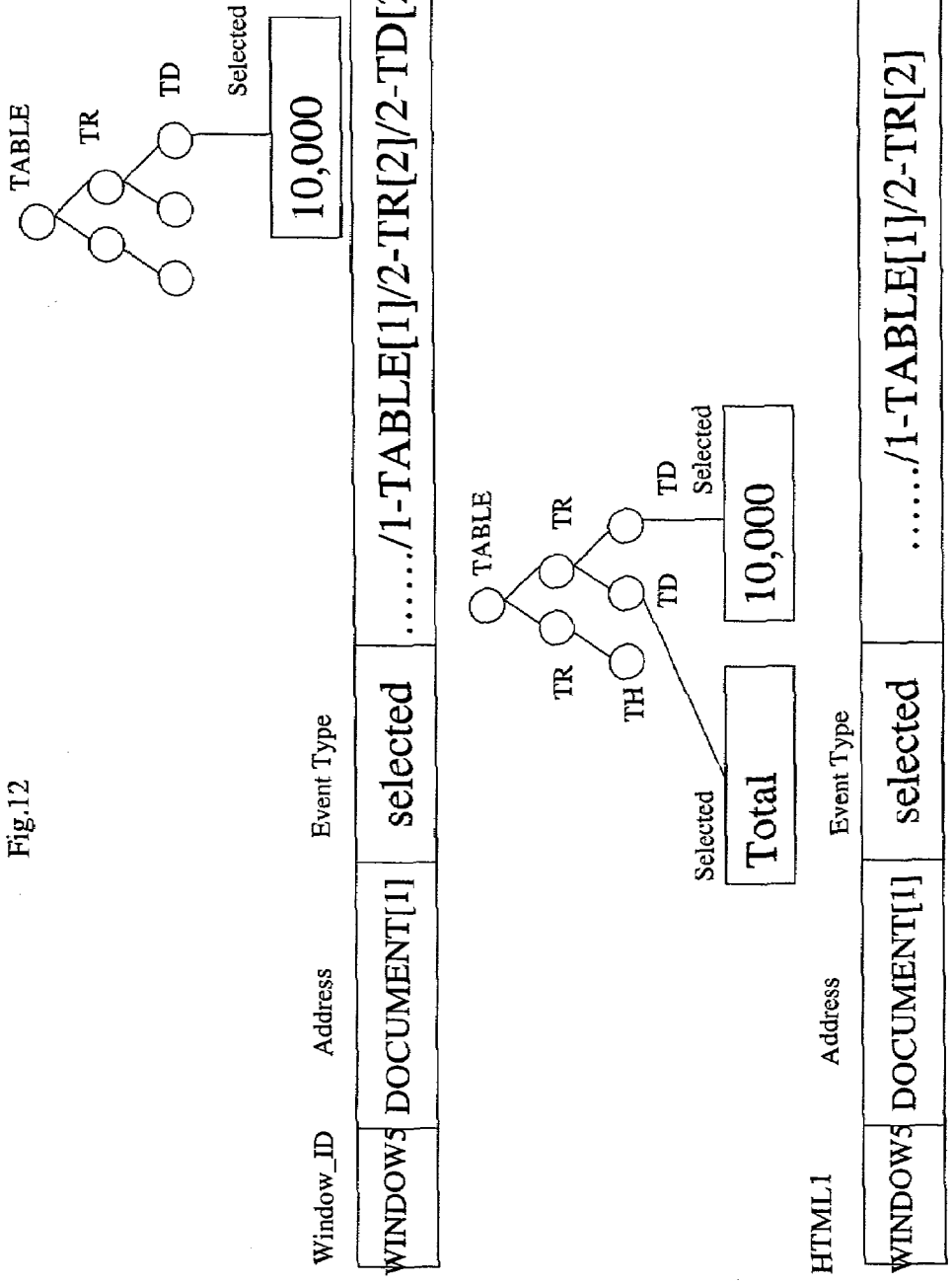
FIG. 12 is a conceptual diagram of a record associated with issuance of a Selected event.

A mouse selection operation on a page can also be recorded as recorded contents (FIG. 12). Thereby, ultimately desired information can be accessed not only page by page but also character string by character string, so that a localized portion of information can be directly accessed. This event is recorded as Selected. Recording is made in the form of an address of an element in which a character string in question is directly held or in the form of the lowest level element of parent elements having a selected character string as descendant.

According to the method of the present invention, the foregoing recording operations are repeated. Specifically, a mouse event is hooked with respect to nodes on each HTML page. Different nodes have different events to be hooked.

Thus, a sequence of records (FIG. 13) of a node address within an HTML page loaded and displayed in each WINDOW, and a mouse event type corresponding to the address is successively created, wherein URL is used as a key for the first sequence and a WINDOW identifier is used as a key for infra second sequence.

Lastly, the sequence is given a name, under which it is managed such that the information can be reproduced when necessary.

Figure 14:
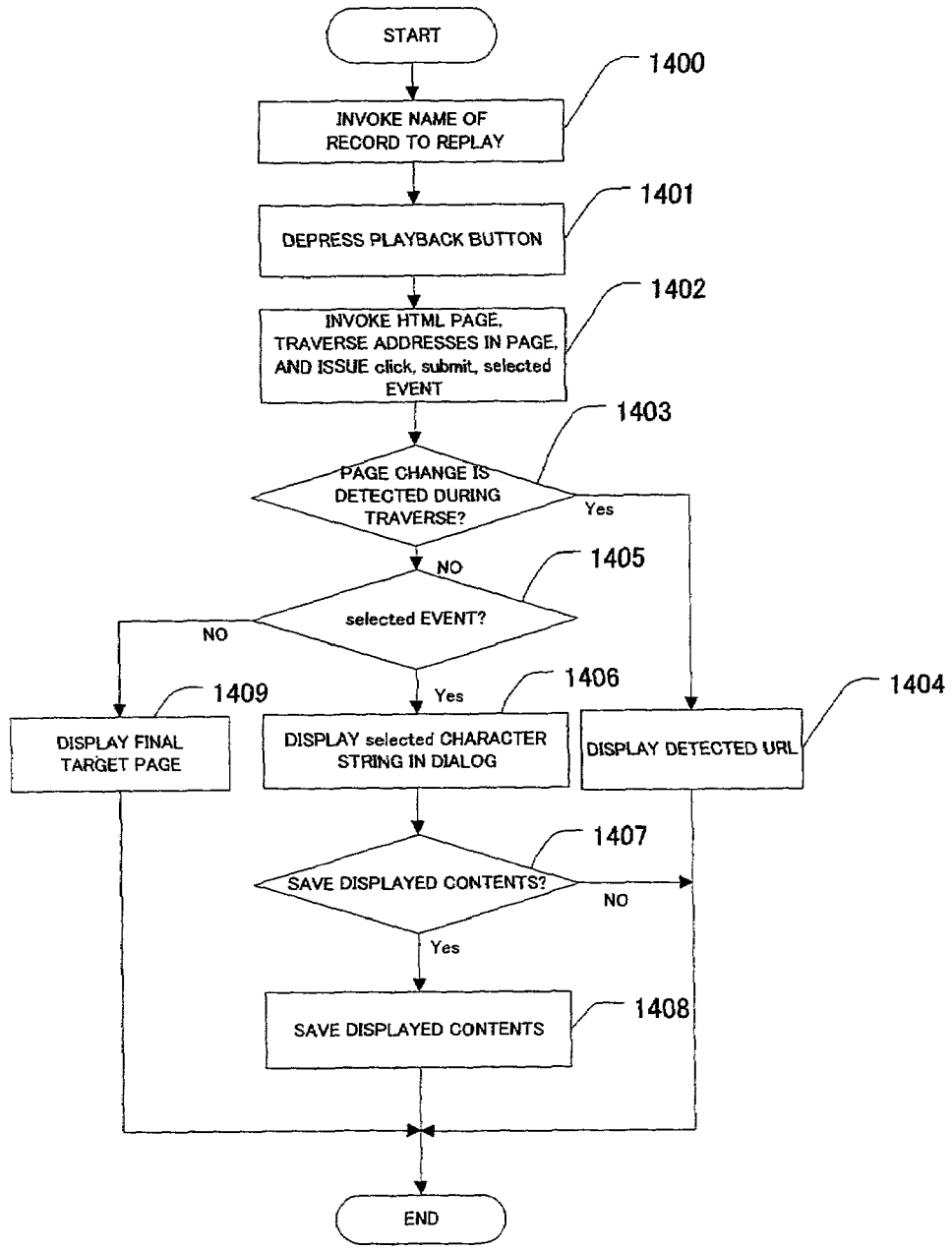
FIG. 14 is a flow chart showing the steps of reproducing manipulations for accessing WWW in accordance with the present invention.
Figure 15:
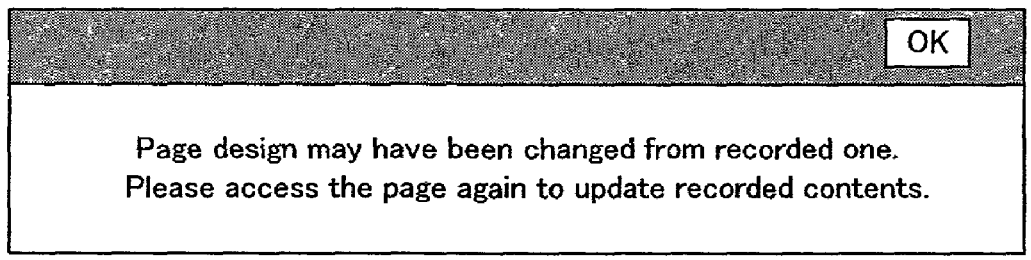
FIG. 15 is a diagram illustrating a warning to be displayed in the present invention.
Figure 16:
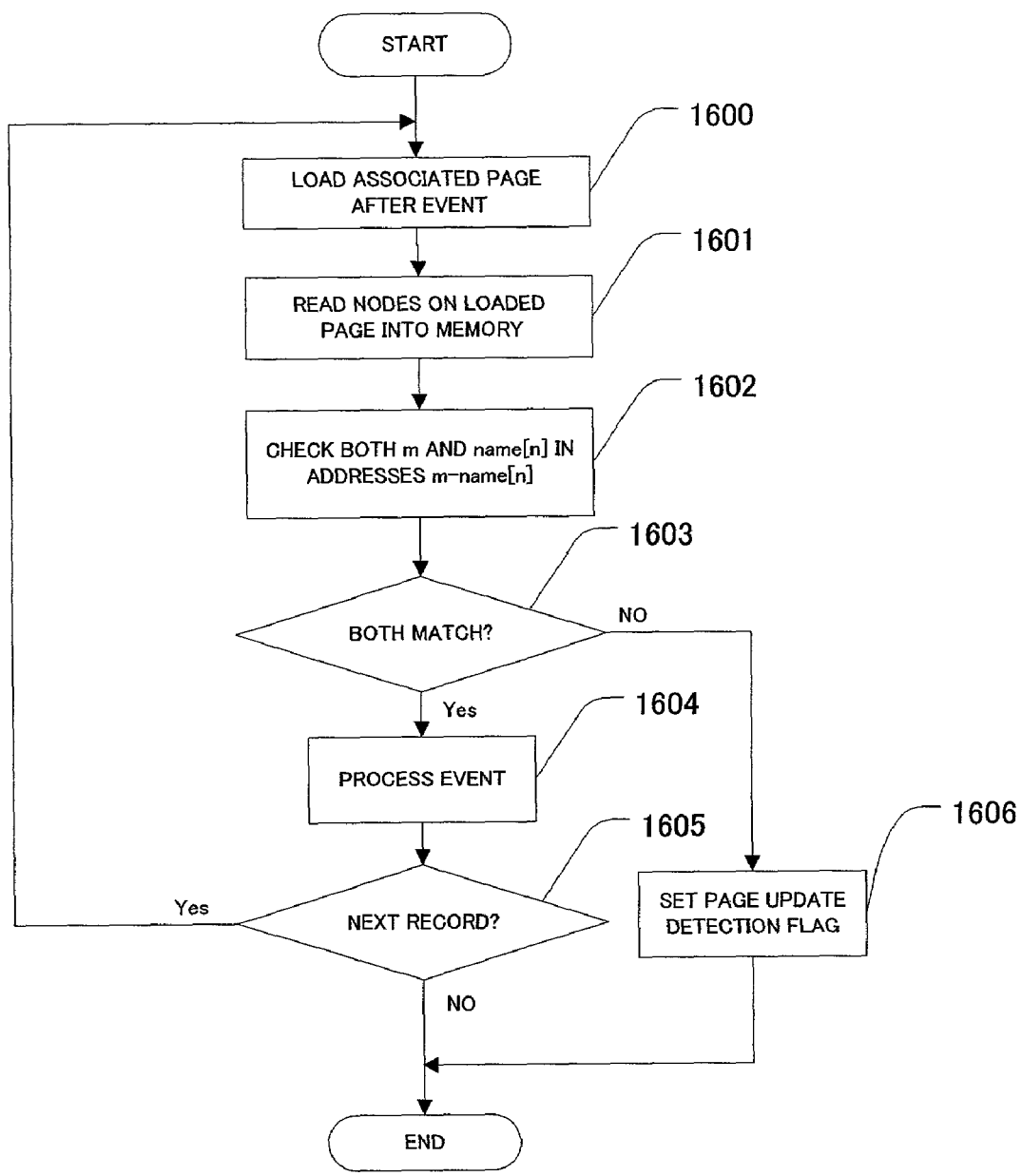
FIG. 16 is a flow chart showing the steps of reproducing manipulations for accessing WWW and of dealing with a change in page configuration in accordance with the present invention.

Referring next to FIGS. 14 through 16, description will be made on an embodiment of a reproducing operation for automatically accessing the same WWW site, displaying a desired page and obtaining information of contents in which a user is especially interested by using the reproduction log (recording information) recorded as described above.

At the time of reproduction, at least the user interface illustrated in FIG. 2 may be displayed although it is not limited thereto.

For reproducing previously recorded contents, a user enters a name given to the contents when they were saved last time in the "RECORD NAME" entry window 203 for invocation (step 1400).

The user depresses the REPLAY button (step 1401).

In the reproduction, recorded web pages are sequentially accessed to issue a variety of recorded events (step 1402).

At the time of reproduction, the present invention counts the number of siblings of all elements and the number of siblings of a particular element with respect to information of all recorded levels, while comparing nodes which had been read page by page at the time of execution, and determines, when discrepancy occurs in either of the numbers of siblings, that the page configuration at the time of recording differs from the page configuration at the time of reproducing and that the page was changed between the time of recording and the time of reproducing (step 1403), and issues a warning as shown in FIG. 15, together with URL detected during reproduction (step 1404).

When an event is Submit, URL returned from the server after the Submit operation is often a dynamic page address generated by CGI. Therefore, in some cases, URL at the time of recording may differ from URL at the time of reproducing. For example, a date of access is often added behind URL, in which case an inconvenience arises if URLs are required to exactly match.

To address the problem, the present invention employs a method of managing recording information under numbers assigned to WINDOWs opened within the browser rather than according to URL. Thereby, the present method provides tolerance to dynamic URL.

The foregoing processing is illustrated in FIG. 16. For example, when a page of referenced URL is loaded after a Submit event occurred (step 1600), a record managed in WINDOW into which the page has previously been loaded can be referenced because the record is not managed according to URL even if this URL includes a CGI format. Then, nodes on the loaded page are read into a memory (step 1601), and any change in page configuration is detected (steps 1602, 1603). If no change is detected, the event is executed (step 1604). If there is a next recorder line, the process goes back to the step 1600. If not, the process is terminated. If a change in page configuration is detected, a flag indicative of detection of page update is set as described above (step 1606) to issue a warning.

Turning back to FIG. 14, when a Selected event occurs (step 1405), a selected character string is displayed in the form of a dialog (step 1406). If an instruction is given to save the displayed contents (step 1407), the contents are saved in a file or a memory (step 1408) and the process is concluded. If no Selected event occurs, a final target page is displayed (step 1409) and the process is concluded.

Lastly, a format for the reproduction log recorded in accordance with the present invention is illustrated below.

URL
WINDOW_ID DOCUMENT[1]/N1-Name[N2]/N1-Name[N2]/N1-Name[N2]/N1-Name[N2]/ ¨ . . . /event
WINDOW_ID DOCUMENT[1]/ ¨ ¨

In the above list, each symbol has the following meaning.

URL: Description of URL of an intended page. A page on which recording is started.

WINDOW_ID: An identifier for a window generated at the time at which a page changes.

DOCUMENT[1]: Description of a top node, i.e., a document root.

/: Movement of dept 1. Specifically, the left side of "/" indicates a parent node, and the right side indicates a child node N1: Indicates the position of an intended node at the same depth.

-: A delimiter.

Name[N2]: Indicates the position in the same element as the intended node event: Describes a type of a mouse event such as Click, Submit and Selected.

(): Contents to be submitted to the server are described in the parenthesis in an address format when a mouse event occurs on a node for Submit.

Figure 17:
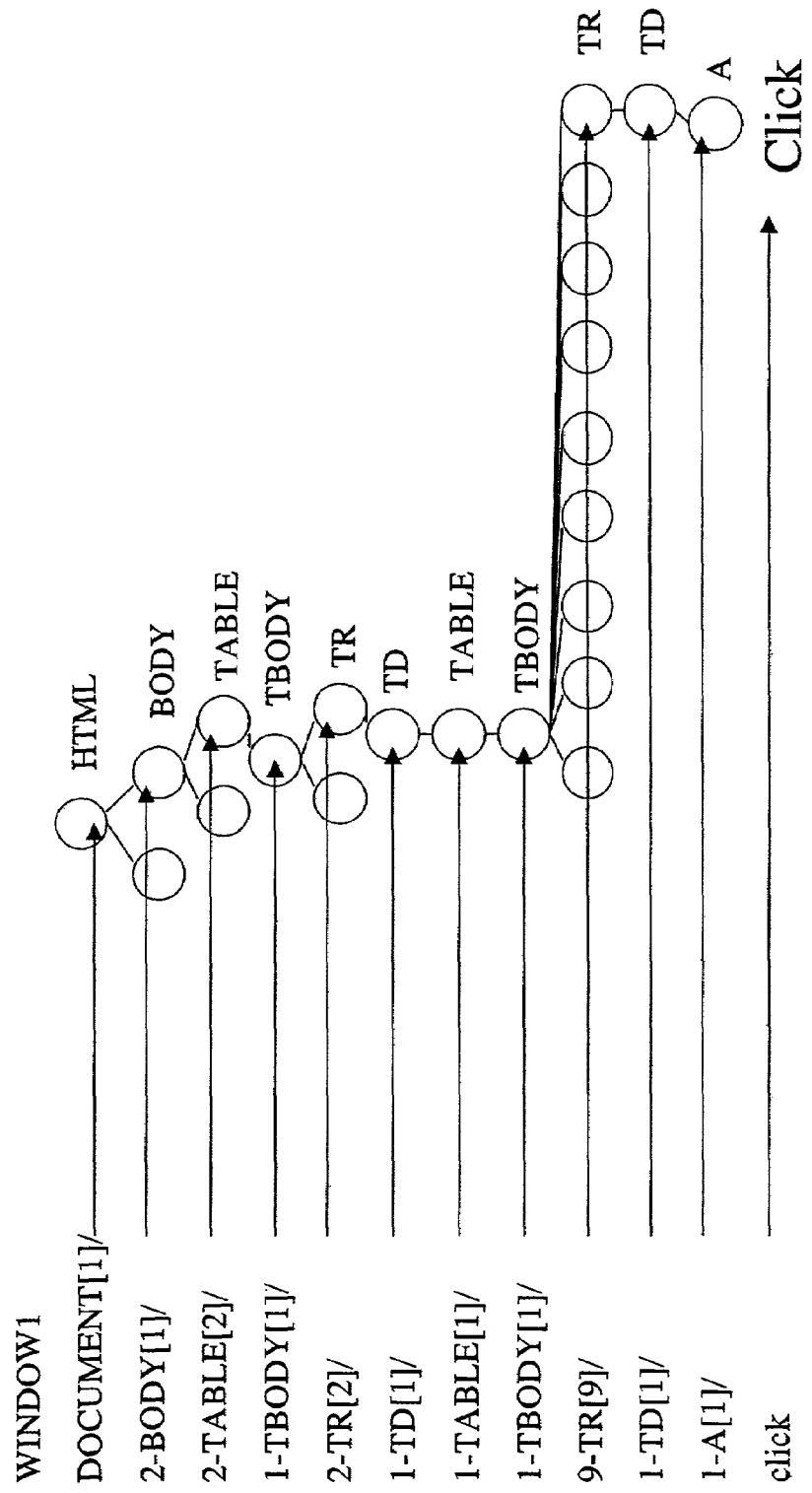
FIG. 17 is a diagram illustrating a format for a reproduction log which is recorded in accordance with the present invention.

For example, a record of a mouse operation log shown on the left side of FIG. 17 means that an associated node on an HTML page of a structure shown in the right side, that is, an anchor in FIG. 17 is clicked on.

It should be understood that the foregoing description on the embodiment is a mere illustration for implementing the present invention and the present invention is in no way limited to this particular embodiment. It should be obvious to those skilled in the art that a variety of modifications can be made without departing from the scope of the present invention. For example, while the foregoing embodiment has been described using as recorded event types Click, Submit, and Selected (selection of information by means of a mouse), the present invention is not limited to these event types and it should be apparent that other event types associated with a keyboard and a mouse can be recorded without departing from the scope of the present invention.

As described above, the present invention records in detail mouse manipulations on a web browser by a user to allow reproduction of the recorded manipulations, thereby providing an environment in which the user can acquire desired information by means of batch processing. Particularly, since Selected events can be recorded, it is possible to record not only page by page but also localized information such as a character string on a page.

Thus, according to the present invention, information that changes in real time can be repeatedly obtained without performing the same operation over and over again.

Further, according to the present invention, if a page configuration of a site has been changed, a user is notified that the page cannot be accessed and recording information is re-created by accessing a desired page again in an interactive manner and reproducing the manipulations, thereby dealing with a change in configuration of a page of a site. Also, the records are not managed by URLs including URLs generated by a program, for example URLs by CGI but by windows on which pages are displayed at the time of recording, thereby making it possible to correspond a recorded page to a page at the time of reproduction to perform reproduction processing on a read node. Thus, the present invention provides tolerance to a large number of dynamic pages that actually exist.

What is claimed is:

1. A method for use with a web browser, said method comprising the steps of:
   accessing a URL and initiating a recording process for said URL;
   assigning a unique identifier to each window, which is established by the web browser to display a respective HTML page, during the recording process,
   for each of the windows established during the recording process, generating a data structure representing a hierarchy of nodes in the respective HTML page, the data structure being used for determining a relative address of a particular node within the respective HTML page; and
   when an event occurs during the recording process with respect to an HTML node displayed in any of said windows, generating a record of the event identifying:
      a corresponding event type,
      the relative address of the HTML node where said event occurred, and
      the unique identifier of the window displaying said HTML node where the event occurred;
   wherein:
      the event records generated during the recording process are stored in a reproduction log in the sequence in which said events occurred,
      the reproduction log is stored in connection with said URL, such that the reproduction log is accessible using the URL as a key, and
      when the URL is reloaded by a web browser, said events occurring during said recording process are reproducible by correlating said unique identifiers and said relative addresses in the event records in the reproduction log to the windows and HTML nodes displayed for said reloaded URL.

2. A method according to claim 1, wherein said event type is a click by a mouse (Click), submit (Submit) for entering information in a form element or selection of information with a mouse (Selected).

3. A method according to claim 1, further comprising the step of:
   utilizing the reproduction log to automatically manipulate a web browser in accordance with the sequence of event records to access a desired WWW page and acquire desired information.

4. A method according to claim 3, further comprising the step of:
   when the configuration of a page in the middle of automatic access is different from the configuration at the time of recording, a user is notified thereof and urged to access said page again.

5. A method according to claim 3, further comprising the step of:
   when the configuration of a page in the middle of automatic access is different from the configuration at the time of recording an event corresponding to the page, continuing the processing using previously recorded information.

6. A method according to claim 1, wherein said URL is used as a key of said reproduction log.

7. A method according to claim 1, wherein said occurring events are web browsing events.

8. The method of claim 1, wherein
   during the recording process, when an occurring event discards one of the displayed windows, the data structure corresponding to the discarded window is discarded.

9. A computer-readable storage medium on which is embodied a program for executing a function in a web browser, by causing a computer to go through the steps of:
   accessing a URL and initiating a recording process for said URL;
   assigning a unique identifier to each window, which is established by the web browser to display a respective HTML page, during the recording process,
   for each of the windows established during the recording process, generating a data structure representing a hierarchy of nodes in the respective HTML page, the data structure being used for determining a relative address of a particular node within the respective HTML page; and
   when an event occurs during the recording process with respect to an HTML node displayed in any of said windows, generating a record of the event identifying:
      a corresponding event type, the relative address of the HTML node where said event occurred, and the unique identifier of the window displaying said HTML node where the event occurred;

wherein:

the event records generated during the recording process are stored in a reproduction log in the sequence in which said events occurred, the reproduction log is stored in connection with said URL, such that the reproduction log is accessible using the URL as a key, and when the URL is reloaded by a web browser, said events occurring during said recording process are reproducible by correlating said unique identifiers and said relative addresses in the event records in the reproduction log to the windows and HTML nodes displayed for said reloaded URL.

10. A computer-readable storage medium according to claim 9, wherein said URL is used as a key of said reproduction log.

11. A computer-readable storage medium according to claim 9, wherein said occurring events are web browsing events.

12. The computer-readable storage medium of claim 9, wherein during the recording process, when an occurring event discards one of the displayed windows, the data structure corresponding to the discarded window is discarded.

13. An apparatus for use with a web browser, said apparatus comprising:

a device for accessing a URL and initiating a recording process for said URL;

a device for assigning a unique identifier to each window, which is established by the web browser to display a respective HTML page, during the recording process, a device for generating, for each of the windows established during the recording process, a data structure representing a hierarchy of nodes in the respective HTML page, the data structure being used for determining a relative address of a particular node within the respective HTML page; and an event recording device configured such that, when an event occurs during the recording process with respect to an HTML node displayed in any of said windows, the event recording device generates a record of the event identifying:

a corresponding event type, the relative address of the HTML node where said event occurred, and the unique identifier of the window displaying said HTML node where the event occurred;

wherein:

the event records generated during the recording process are stored in a reproduction log in the sequence in which said events occurred, the reproduction log is stored in connection with said URL, such that the reproduction log is accessible using the URL as a key, and when the URL is reloaded by a web browser, said events occurring during said recording process are reproducible by correlating said unique identifiers and said relative addresses in the event records in the reproduction log to the windows and HTML nodes displayed for said reloaded URL.

14. An apparatus according to claim 13, wherein said URL is used as a key of said reproduction log.

15. An apparatus according to claim 13, wherein said occurring events are web browsing events.

16. The apparatus of claim 13, wherein during the recording process, when an occurring event discards one of the displayed windows, the data structure corresponding to the discarded window is discarded.

* * * * *